(12) United States Patent
Correa Bahnsen et al.

(10) Patent No.: US 11,062,136 B2
(45) Date of Patent: Jul. 13, 2021

(54) PUPIL OR IRIS TRACKING FOR LIVENESS DETECTION IN AUTHENTICATION PROCESSES

(71) Applicant: Easy Solutions Enterprises Corp., Doral, FL (US)

(72) Inventors: Alejandro Correa Bahnsen, Bogota (CO); Martín Ochoa Ronderos, Bogotá D.C. (CO); Pablo Salvador Romero Agreda, Bogotá D.C. (CO); Jesus Alberto Solano Gomez, Bogotá D.C. (CO)

(73) Assignee: Easy Solutions Enterprises Corp., Doral, FL (US)

( * ) Notice: Subject to any disclaimer, the term of this patent is extended or adjusted under 35 U.S.C. 154(b) by 27 days.

(21) Appl. No.: 16/460,058

(22) Filed: Jul. 2, 2019

(65) Prior Publication Data

US 2021/0004588 A1    Jan. 7, 2021

(51) Int. Cl.
*G06K 9/00* (2006.01)
*G06F 21/32* (2013.01)
*G06F 9/451* (2018.01)

(52) U.S. Cl.
CPC ......... *G06K 9/00617* (2013.01); *G06F 9/451* (2018.02); *G06F 21/32* (2013.01); *G06K 9/0061* (2013.01); *G06K 9/00288* (2013.01); *G06K 9/00604* (2013.01); *G06K 9/00744* (2013.01)

(58) Field of Classification Search
CPC .......... G06K 9/00617; G06K 9/00288; G06K 9/00604; G06K 9/0061; G06K 9/00744; G06F 9/451; G06F 21/32
See application file for complete search history.

(56) References Cited

U.S. PATENT DOCUMENTS

| | | | | |
|---|---|---|---|---|
| 6,785,406 B1* | 8/2004 | Kamada | ............. | G06K 9/00597 340/5.53 |
| 7,986,816 B1* | 7/2011 | Hoanca | .............. | G06K 9/00597 382/115 |
| 8,856,541 B1* | 10/2014 | Chaudhury | ........ | G06K 9/00912 713/186 |
| 9,367,677 B1* | 6/2016 | Adhami | ................... | G06F 21/32 |
| 9,449,217 B1* | 9/2016 | Bourlai | ............. | G06K 9/00221 |
| 10,481,786 B2* | 11/2019 | Oguz | ....................... | G06F 21/32 |
| 2005/0152583 A1* | 7/2005 | Kondo | ...................... | G06T 7/62 382/117 |
| 2005/0270386 A1* | 12/2005 | Saitoh | ................ | G06K 9/00906 348/239 |
| 2006/0192868 A1* | 8/2006 | Wakamori | ......... | G06K 9/00604 348/294 |
| 2013/0044920 A1* | 2/2013 | Langley | ............. | G06K 9/00268 382/115 |
| 2014/0147002 A1* | 5/2014 | Park | ..................... | G06K 9/0061 382/103 |
| 2015/0033305 A1* | 1/2015 | Shear | ..................... | G06F 21/53 726/6 |

(Continued)

*Primary Examiner* — Ian L Lemieux
(74) *Attorney, Agent, or Firm* — Greenberg Traurig (57) ABSTRACT

The disclosed techniques include systems and methods for implementing liveness detection in an authentication process using pupil or iris tracking. The disclosed techniques can utilize a combination of facial recognition and pupil or iris tracking for liveness detection in an authentication process to provide an extra layer of security against impersonation attacks.

20 Claims, 7 Drawing Sheets

(56) References Cited

U.S. PATENT DOCUMENTS

| 2016/0112414 | A1* | 4/2016 | Tsou ..................... G06F 21/32 |
| | | | 726/7 |
| 2017/0206343 | A1* | 7/2017 | Oguz ................ H04W 12/0608 |
| 2019/0156117 | A1* | 5/2019 | Minagawa ............ G06F 21/556 |
| 2019/0370450 | A1* | 12/2019 | Fletcher ............. G06K 9/00617 |
| 2020/0026917 | A1* | 1/2020 | Qin .................... G06K 9/00255 |

* cited by examiner

PUPIL OR IRIS TRACKING FOR LIVENESS DETECTION IN AUTHENTICATION PROCESSES

TECHNICAL FIELD

Embodiments of the disclosure relate generally to pupil or iris tracking for liveness detection in authentication processes.

BACKGROUND

Impersonations and identity spoofing to access computer services and networks are becoming a cause for concern. Spoofing attacks or impersonations often include a person or program successfully masquerading as another by falsifying data to gain illegitimate access to an electronic service or a computer network.

A biometric recognition system (BRS) can be used to identify and verify the identity of a person based on unique physical or behavioral characteristics of the person. Common ways for authenticating an identify of a person using a BRS can include fingerprints, image analysis on facial features, and iris scans, just to name a few. However, a BRS can be vulnerable to spoofing attacks, just as other forms of authentication can be susceptible to impersonations. For example, a relatively simple way of spoofing a facial recognition system in an authentication process is to use a recording of the impersonated person (such as a photograph of the impersonated person) to deceive the facial recognition system. A fraudulent user can place a photograph of a legitimate user in front of the camera capturing the image of the face for facial recognition; thus, the facial recognition can be tricked by the photograph. Such spoofs can be limited by sophisticated hardware or software, but such technologies can be expensive and cumbersome to implement. Also, with a more sophisticated facial recognition system, the system requires more computer resources to operate effectively.

SUMMARY

Examples of the systems and methods disclosed herein for implementing liveliness detection in an authentication process using pupil or iris tracking provide specific technical solutions to at least the technical problems mentioned in the background section and other parts of the application as well as other technical problems not described herein but recognized by those of skill in the art.

The disclosed techniques can utilize a combination of facial recognition and pupil or iris tracking for liveness detection in an authentication process to provide an extra layer of security against impersonation attacks.

In some embodiments, the techniques can include a method including receiving, via a user interface of an electronic device, a user identification from a user for accessing an electronic service. The user identification can be manually entered into the user interface by the user and/or the user identification can be stored on or part of a device—such as a fob, mobile phone, or a credit card—and automatically communicated into the user interface as input for accessing the electronic service through an authentication process. The method can also include recording, by a camera communicatively coupled to the electronic device, a video of the user in response to receiving the user identification. The method can also include extracting, by the electronic device or a second electronic device, a set of frames from the recorded video of the user. The method can also include executing, by the electronic device or the second electronic device, a face matching process that uses the user identification and one or more frames of the set of frames as input. The method can also include measuring, by the electronic device or the second electronic device, an amount of movement of a pupil or an iris of an eye of the face of the user over the set of frames, in response to a recorded face of the user in the one or more frames of the set of frames matching stored face data associated with the user identification according to the face matching process. The method can also include determining, by the electronic device or the second electronic device, to perform a security action based on the amount of movement of the pupil or the iris.

In some embodiments, the method can further include measuring, by the electronic device or the second electronic device, an amount of movement of a second pupil or a second iris of a second eye of the face of the user over the set of frames, in response the recorded face matching the stored face data according to the face matching process. In such embodiments, the method can also include determining, by the electronic device or the second electronic device, to perform a security action based on the amount of movement of the pupil or the iris as well as the amount of movement of the second pupil or the second iris. The measuring of the amounts of movement of the first and second pupils or irises can include locating pupil centers of each pupil of the face and tracking the movements of the pupil centers over the extracted set of frames. Also, the measuring of the amounts of movement of the first and second pupils or irises can include, for each pupil center and for each frame of the set of frames, measuring a distance between the pupil center and a lateral corner of the eye including the pupil center as well as measuring a distance between the pupil center and a medial corner of the eye including the pupil center. Also, the measuring of the amounts of movement of the first and second pupils or irises can include, for each pupil center and for each frame of the set of frames, measuring a distance between the pupil center and a lateral palpebral commissure of the eye including the pupil center as well as measuring a distance between the pupil center and a medial palpebral commissure of the eye including the pupil center.

The determining to perform the security action based on the amount of movement of the pupil or the iris as well as the amount of movement of the second pupil or the second iris, can include comparing the measured distances from each frame of the frame set to generate a distance similarity score representative of similarity between the measured distances from frame to frame. And, in such embodiments, the method can also include determining to perform the security action and performing the security action, in response to the distance similarity score being below a distance similarity threshold.

The determining to perform the security action based on the amount of movement of the pupil or the iris as well as the amount of movement of the second pupil or the second iris can include comparing the measured distances from each frame of the frame set to generate respective distance similarity scores for each eye representative of similarity between the measured distances from frame to frame for each eye. Such a determination can also include determining an average distance similarity score based on the respective distance similarity scores for each eye. And, in such embodiments, the method can further include determining to perform the security action and performing the security action, in response to the average distance similarity score being below a distance similarity threshold.

In some embodiments, the method can include generating a distance similarity score (DSS) by comparing the measured distance(s) in a first frame of the set of frames to the measured distance(s) in a second frame of the set of frames, e.g., Similarity Score equals Absolute Value of ([Distance Between Pupil Center And Right Corner For Frame 1] minus [Distance Between Pupil Center And Right Corner For Frame 2])).

In some embodiments, the method can include comparing, by the electronic device or the second electronic device, the amount of measured movement of the pupil or the iris of the user (e.g., wherein the amount of measure movement can be represented by DSS) to a threshold to determine whether the measured amount of movement of the pupil or the iris is below the threshold. In such embodiments, the method can include performing, by the electronic device or the second electronic device, a security action in response to the measured amount movement of the pupil or the iris being below the threshold. Also, the method can include measuring, by the electronic device or the second electronic device, an amount of movement of a second pupil or a second iris of a second eye of the face of the user over the set of frames, in response the recorded face matching the stored face data according to the face matching process. And, the method can include comparing, by the electronic device or the second electronic device, the measured amount of movement of the second pupil or the second iris of the user (e.g., wherein the amount of measure movement can be represented by DSS) to the threshold to determine whether the measured amount of movement of the second pupil or the second iris is below the threshold. And, the method can include performing, by the electronic device or the second electronic device, a second security action in response to the measured amount movement of the pupil or the iris being below the threshold as well as the measured amount movement of the second pupil or the second iris being below the threshold. In some examples, the first and second security actions can be the same type of security action. Or, in other examples, the first and second security actions can be different types of security actions.

In some embodiments, the measuring of the amount of movement of the pupil or iris can include, for each frame in the set of frames, identifying a first point in the pupil or the iris and a second point in a corner of the eye as well as measuring a distance between the first point and the second point. In such embodiments, the identifying the second point can include identifying the second point in a palpebral commissure of the eye. Also, the identifying the first point can include identifying the first point in a central region of the pupil.

In some embodiments, the measuring of the amount of movement of the pupil or iris can include, for each frame in the set of frames, identifying a point in the pupil, a point in a lateral palpebral commissure of the eye, and a point in a medial palpebral commissure of the eye as well as measuring a distance between the point in the pupil and the point in the lateral palpebral commissure and measuring a distance between the point in the pupil and the point in the medial palpebral commissure.

In some embodiments, the face matching process can include retrieving, from a database of the service, the stored face data associated with the user identification. In such embodiments, the method can include comparing the stored face data to a recorded image of the face of the user in the one or more frames of the set of frames to identify whether the recorded image of the face of the user matches the stored face data. The comparing the stored face data to the recorded image of the face of the user can include segmenting parts of the recorded image prior to comparing the recorded image to the stored face data as well as comparing facial features within the segmented parts of the recorded image to corresponding facial features in the stored face data.

In some embodiments, the method can further include performing, by the electronic device or the second electronic device, the security action in response to determining to perform the security action. In such examples, the security action can include tagging, by the electronic device or the second electronic device, the accessing of the electronic service as suspicious. The security action can also include blocking, by the electronic device or the second electronic device, the user from accessing the service via the electronic device.

In some embodiments, the method can further include initiating, by the electronic device or the second electronic device, an authentication process for the electronic service, in response to receiving the user identification. The method can also include inducing, by the user interface of the electronic device, the user to adjust a gaze direction of the eyes of the user, in response to initiating the authentication process. And, the method can include recording, by the camera, the video of the user in response to initiating the authentication process for the service and/or during the inducing of the user to adjust the gaze direction. In such examples, the security action can include ending, by the electronic device or the second electronic device, the authentication process of the service. Also, the security action can include continuing the authentication process and increasing the number of factors used in the authentication process when the authentication process includes a multi-factor authentication process. Further, the security action can include continuing the authentication process and changing the authentication process to a multi-factor authentication process when the authentication process initially includes a single-factor authentication process (e.g., a single-factor authentication process can be a process only using a username and password as input for authentication).

Some of the technologies described herein include a computer system. The computer system can implement the features and operations of the aforesaid methods and the aforesaid medium. The medium can specifically be implemented by memory of the system. The computer system can also include the processing device.

BRIEF DESCRIPTION OF THE DRAWINGS

The present disclosure will be understood more fully from the detailed description given below and from the accompanying drawings of various embodiments of the disclosure.

DETAILED DESCRIPTION

The disclosed techniques herein include systems and methods for implementing liveliness detection in an authentication process using pupil or iris tracking. The disclosed techniques provide specific technical solutions to at least the technical problems mentioned in the background section and other parts of the application as well as other technical problems not described herein but recognized by those of skill in the art. The disclosed techniques can utilize a combination of facial recognition and pupil or iris tracking for liveliness detection in an authentication process to provide an extra layer of security against impersonation attacks.

A way to solve spoofing of facial recognition systems and improve on the security of such systems is to provide techniques for determining actual presence of a real biometric sample (e.g., a real finger, a real user face, etc.) by using natural movements of a person. Techniques disclosed herein can solve the problems disclosed herein and other technical problems faced by a BRS by using pupil or iris movement tracking. For instance, such tracking can be used with a facial recognition system as a second factor in a multiple factor authentication process.

A great number of known facial recognition techniques lack anti-spoofing filters. Moreover, mainstream facial recognition systems can be based on processing images from a generic camera. Liveness detection methods which do not use another recording device beyond a regular camera can be susceptible to spoofing. And, with such systems, sophisticated and expensive add-ons are often needed—such as more sophisticated software or expensive biometric recognition hardware. When only using a general camera as the recording device in a biometric recognition system, liveness detection often occurs through software and such detection can be categorized into two main groups: static and dynamic approaches.

A static approach analyzes a single image and the image is often captured in a non-intrusive interaction with the user. Some embodiments described herein can use a static approach for facial recognition and face matching. Some of these embodiments can use a local binary pattern (LBP) operator on an image and then feed the output to a support vector machine (SVM) classifier.

On the other hand, a dynamic approach analyzes a sequence of input images and usually requires the user to perform specific actions to move forward with authentication. This is an effective way of detecting liveliness; however, requiring the user to perform additional actions in the authentication process can be intrusive to the user experience. Dynamic approaches can include, for example, eye blinking analysis and smile detection. Some aspects of the techniques disclosed herein can use dynamic approaches for liveliness detection and can provide the detection without requiring the user to perform certain physical actions in the authentication process that may be considered intrusive. In other words, many of the techniques described here can replace intrusive dynamic techniques for liveness detection using systems and methods that are seamless with other steps in accessing a computer network or electronic service. For example, the liveliness detection described herein can be seamless with usual and expected authentication processes but additionally provide the liveliness detection which provides an extra layer of security.

In some embodiments, the techniques disclosed herein can require the user to be authenticated at least partially via a short video of the user. In such embodiments, the techniques can extract a small number of frames from the video and can perform an analysis on the extracted frames. In some example embodiments, the techniques can use a face matching process to verify the face of the user with a previously enrolled user's face. If the face matching is positive, the techniques can track motion of a point or area in a pupil or in an iris (e.g., track motion of the pupil center). The tracking can occur over the extracted frames and can include searching for movements of the point with respect to another area or point of the eye (such as a corner point of the eye—e.g., a commissure of the eye).

In some embodiments, the techniques can include a method including extracting frames of the original video of the user recorded by a camera of the system. The method can also include performing face segmentation and face matching with the previously enrolled user for each frame. When using face segmentation, specific facial features can be analyzed independently or based on other facial features. If the face matching is positive for all frames or most frames, depending on the implementation, the method can continue with locating the pupil centers and tracking movement of the pupil centers over the extracted frames. The method can also include measuring the distance between the pupil center (or another point or area of the pupil or iris) and left and/or right commissures of an eye for each frame. This can be done for one eye or both eyes of a user. In some embodiments, the method can include measuring the distance between the pupil center (or another point or area of the pupil or iris) and lateral and/or medial palpebral commissures for each frame. The method can also include comparing the distances obtained from all or selected frames of the set of frames and providing a score of distances similarity between the frames.

The score can be a distance similarity score (DSS), which can be used to detect liveness with a facial recognition system. For example, if the DSS is below a predetermined threshold for detecting liveliness, the DSS can indicate a high probability of a spoofing attack.

Figure 6A:
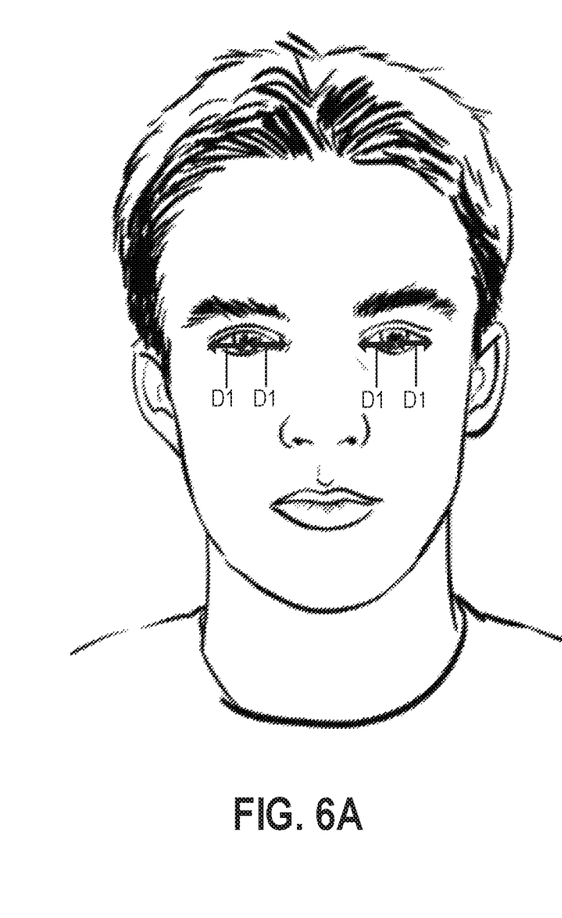
FIGS. 6A, 6B, 7A and 7B depict images of example pupil tracking.
Figure 6B:
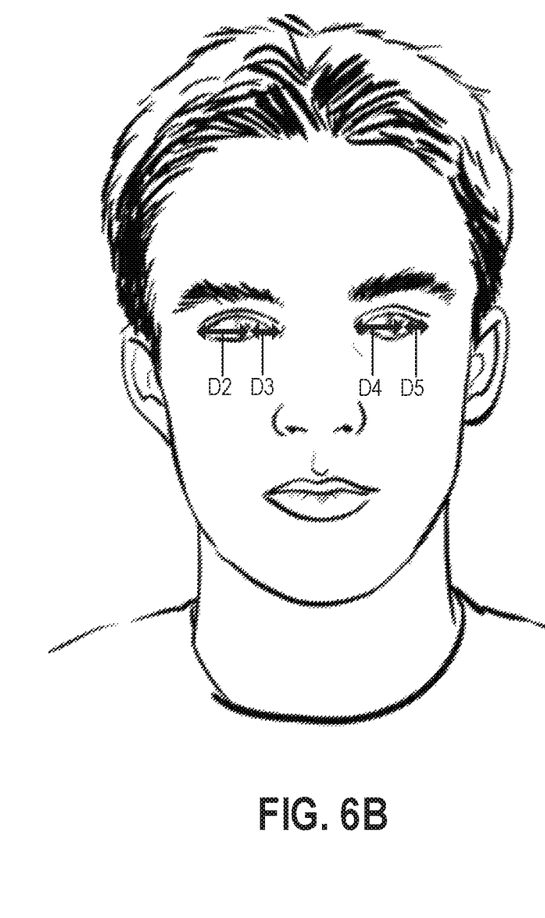

FIGS. 6A and 6B show two different frames of a video capturing a face from a legitimate user who is trying to be authenticated using an embodiment of the system disclosed herein. In FIGS. 6A and 6B, shown are two different video frames that were extracted during an authentication process. The image in FIG. 6A shows, with black double-headed arrows, the distances between the pupil center and eye commissures for each eye, in which the user is gazing forward. As shown all the distances are of a length D1 in FIG. 6A when the user is gazing forward. It should be understood the FIG. 6A provides a simpler example to illustrate the user gazing forward in that all identified distances are equal. In other scenarios, the distances when a user is gazing forward may be very slightly different. The image in FIG. 6B shows significantly different identified distances between the pupil centers and the corners of the eyes (e.g., different lengths D2, D3, D4, and D5), due to the user gazing to the right. As can be seen, there is a significant difference between the distances shown in the two frames of the set of record frames of FIG. 6A and FIG. 6B, which can be an indication of liveliness. In other words, the indicated distances in the frames in FIGS. 6A and 6B can be an indication of a recording of a real user instead of a recording of a recorded image of the user.

Figure 7A:
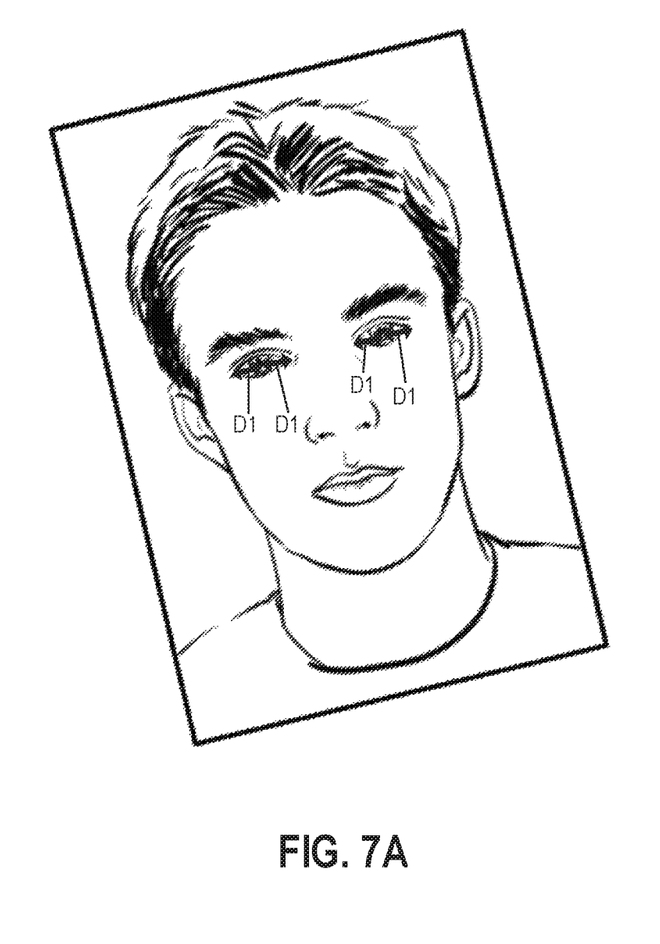
Figure 7B:
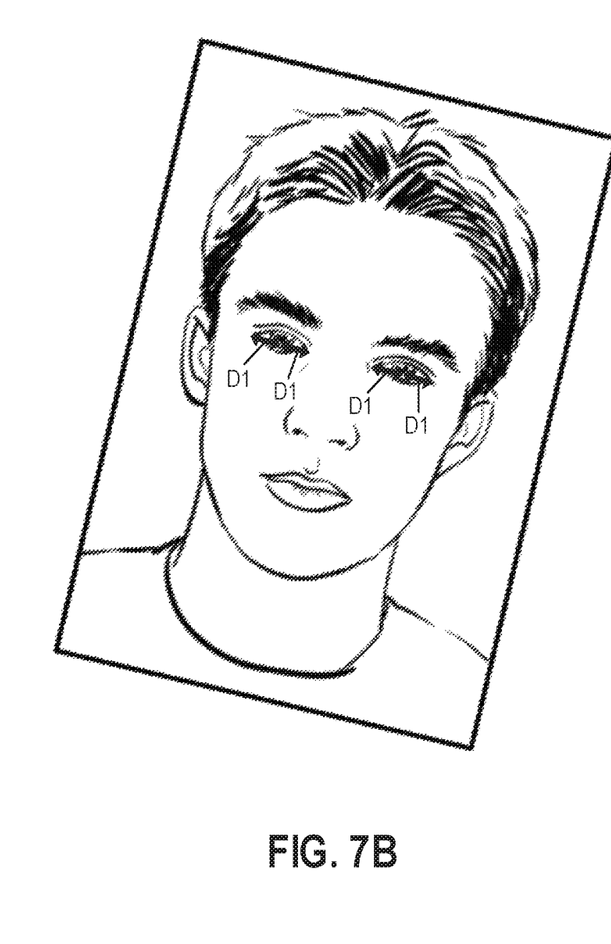

Now consider a spoofing attack in which the impersonator uses a printed photo to deceive the facial recognition system. The attacker can rotate and shift the printed photo to fool the system into determining that the user is moving and real. Such an impersonation is shown in FIGS. 7A and 7B. In FIGS. 7A and 7B, depicted are two different video frames extracted during an attacker's authentication process. The frames are derived from a printed image of a person instead of a real person. In other words, the source of the face captured in the video, which is recorded during the authentication process, is a printed image recorded during the process and not a live person being recorded during the process as in FIGS. 6A and 6B. The image in FIG. 7A shows, with black double-headed arrows, the distances between the pupil center and eye commissures for each eye when the user is rotating a printed image of a person. The image in FIG. 7B shows no variations in the distances identified since the user is only moving the photographic image. The lengths of the distances remain the same from one frame to another frame (e.g., all distances from frame to frame are D1 in FIGS. 7A and 7B). This depiction of no variance in the distances between frames is an indicator of a high probability of a spoofing attack. Occurrences of low variance of distances between frames instead of no variance can also be an indicator of a probable spoofing attack. Also, it is to be understood that FIGS. 6A, 6B, 7A, and 7B provide a simpler than usual example of the difference between a real user and an impersonator to facilitate the understanding of liveness detection by some embodiments disclosed herein.

Also, the DSS, which can be derived from the identified distances in the frames, can reveal information about the presence of a legitimate user being analyzed via the facial recognition system versus an impersonator.

It is important to note that measuring the distances between pupils/irises and corners of the eyes can be done in a non-intrusive way to the user's experience with the authentication process or the electronic service. The liveness detection of such embodiments can detect liveness without requesting and/or requiring the user to take certain gazing actions. Alternatively, some embodiments can induce a movement of the user's pupils or irises. Such embodiments can be less and more intrusive depending on the implementation. For example, such embodiments can show information in motion on a screen in front of the user. In these examples, the system is indirectly inducing the user to move his or her eyes. Some example embodiments can request and/or require, through instructions on a display, for the user to gaze in certain directions.

In summary, the techniques disclosed herein can add an additionally layer of security to a facial recognition system. Features and advantages of the systems disclosed herein can provide an additional security layer to the facial authentication process and increase the confidence level of the biometric recognition system. And, such techniques can be less-intrusive than known forms of liveness detection. The techniques can also provide frictionless authentication, and can have real-time capability and low computational costs. And, the techniques can provide flexibility and scalability to an authentication system using liveness detection.

Figure 1:
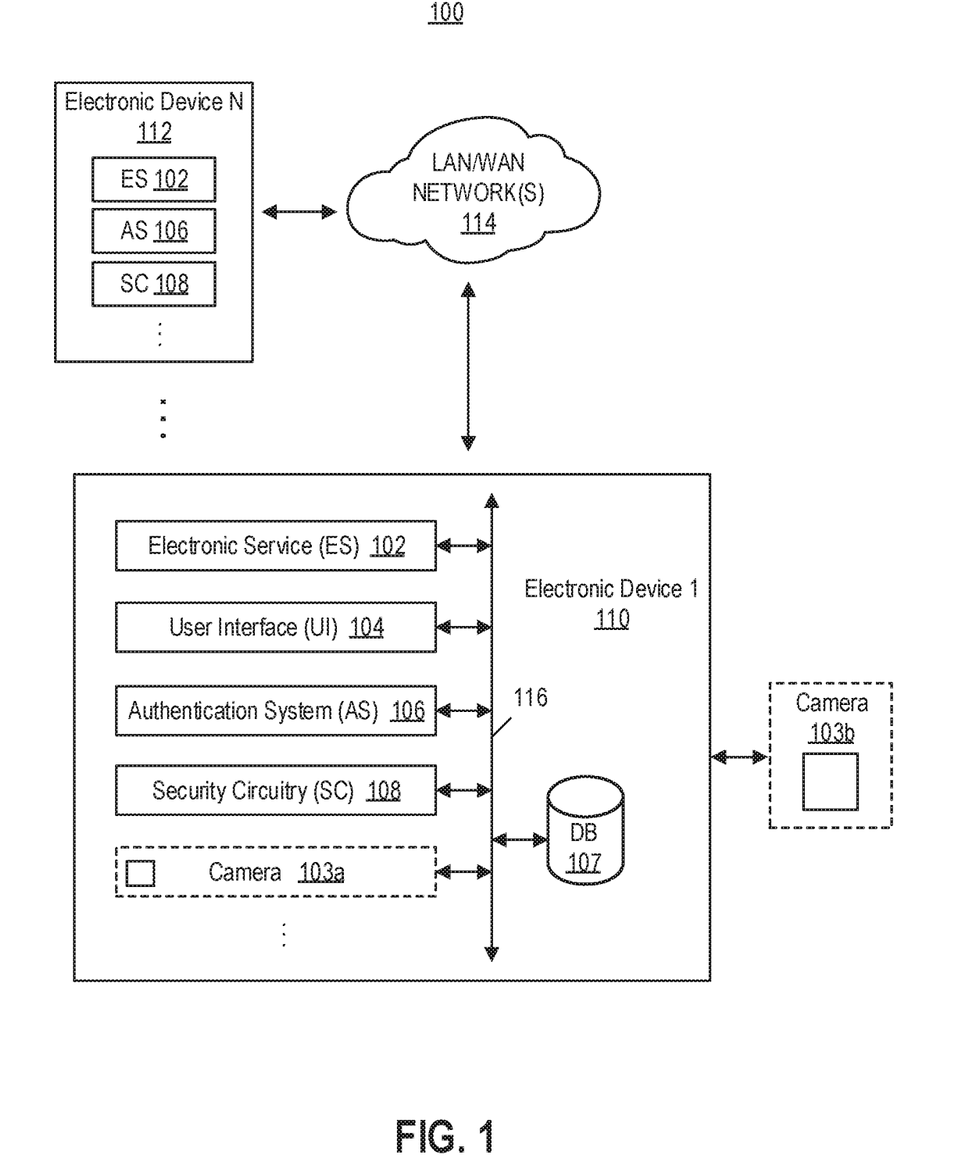
FIG. 1 illustrates an example network of computer systems to implement technologies for liveliness detection in an authentication process using pupil or iris tracking, in accordance with some embodiments of the present disclosure.

FIG. 1 illustrates an example network of computer systems 100 to implement technologies for liveness detection in an authentication process using pupil or iris tracking, in accordance with some embodiments of the present disclosure. The example network of computer systems 100 can implement any of the aforesaid components and operations as well as any component or operation described herein.

The network of computer systems 100 is shown including electronic service circuitry 102 (ES 102), user interface circuitry 104 (UI 104), authentication system circuitry (AS 106), a database 107 (DB 107) that provides data to at least the AS 106, and security circuitry 108. Each of the multiple circuitries shown can be a part of one or more electronic devices (e.g., electronic devices 110 and 112). The network of computer systems 100 is also shown including a camera 103a, which can optionally be a part of the one or more electronic devices. The network of computer systems 100 is also shown including a camera 103b, which can optionally be a camera separate from the one or more electronic devices and communicatively coupled to the one or more electronic devices such as via a local bus and/or a computer network. The network of computer systems 100 is also shown including a bus 116 that interconnects the multiple circuitries depicted in FIG. 1 as well as the database 107 and the optional camera 103a.

The network of computer systems 100 is also shown including one or more local area networks and/or wide area networks 114 (LAN/WAN network(s) 114) which are shown communicatively coupling the electronic devices 110 and 112. The LAN/WAN network(s) 114 can include one or more local area networks (LAN(s)) and/or one or more wide area networks (WAN(s)). The LAN/WAN network(s) 114 can include the Internet and/or any other type of interconnected communications network. The LAN/WAN network(s) 114 can also include a single computer network or a telecommunications network. More specifically, the LAN/WAN network(s) 114 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

At least each shown component of the network of computer systems 100 can be or include a computer system which can include memory that can include media. The media can include or be volatile memory components, non-volatile memory components, or a combination of such. In some embodiments, the memory is a storage system. An example of a storage system is a SSD. In some embodiments, the memory is a hybrid memory/storage sub-system. In general, each of the computer systems can include a host system that uses the memory. For example, the host system can write data to the memory and read data from the memory.

The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

A memory system controller (hereinafter referred to as "controller") can communicate with the memory components to perform operations such as reading data, writing data, or erasing data at the memory components and other such operations. The controller can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or other suitable processors. The controller can include a processor (processing device) configured to execute instructions stored in local memory. The local memory of the controller can include an embedded memory configured to store instructions for performing various processes, operations, logic flows, and routines that control operation of the memory, including handling communications between the memory and the host system. In general, the controller can receive commands or operations from the host system and can convert the commands or operations into instructions or appropriate commands to achieve the predetermined desired access to the memory components.

The memory can also include additional circuitry or components. In some embodiments, the memory can include a cache or buffer (e.g., DRAM) and address circuitry (e.g., a row decoder and a column decoder) that can receive an address from the controller and decode the address to access the memory components.

In some aspects of the present disclosure, the memory can include any combination of the circuitries 102, 104, 106 and 108 as well as the database 107 or any combination of parts of the aforementioned circuitries and the database. In some embodiments, the controller includes at least a portion of the circuitries 102, 104, 106 and 108 as well as the database 107. For example, the controller can include a processor (processing device) configured to execute instructions stored in local memory for performing the operations described herein such as the operations described herein associated with the circuitries 102, 104, 106 and 108 and the database 107. In some embodiments, the circuitries 102, 104, 106 and 108 as well as the database 107 is part of the host system, an application, or an operating system.

The circuitries 102, 104, 106 and 108 as well as the database 107 can use the memory, the memory components, and the host system to implement technologies for performing liveness detection in an authentication process using pupil or iris tracking.

Further details with regards to the operations of the circuitries 102, 104, 106 and 108 as well as the database 107 are described below. As shown in FIG. 1, the network of computer systems 100 can include the circuitries 102, 104, 106 and 108 as well as the database 107 within one or more electronic devices (e.g., electronic devices 110 and 112).

In some embodiments, the technologies disclosed herein can include a system including a user interface of an electronic device (e.g., see UI 104 depicted in FIG. 1), a camera communicatively coupled to the electronic device (e.g., see camera 103a or camera 103b), and the electronic device (e.g., see electronic device 110) as well as optionally one or more other electronic devices (e.g., see electronic device 112). The one or more other electronic devices can include a second electronic device (e.g., see electronic device 112). The user interface of the electronic device can be configured to receive a user identification from a user for accessing an electronic service. The camera can be configured to record a video of the user in response to the electronic device receiving the user identification. The electronic device or the second electronic device can be configured to extract a set of frames from the recorded video of the user. The electronic device or the second electronic device can also be configured to execute a face matching process that uses the user identification and one or more frames of the set of frames as input. The electronic device or the second electronic device can also be configured to measure an amount of movement of a pupil or an iris of an eye of the face of the user over the set of frames, in response to a recorded face of the user in the one or more frames of the set of frames matching stored face data associated with the user identification according to the face matching process. The electronic device or the second electronic device can also be configured to determine to perform a security action based on the amount of movement of the pupil or the iris.

Figure 2:
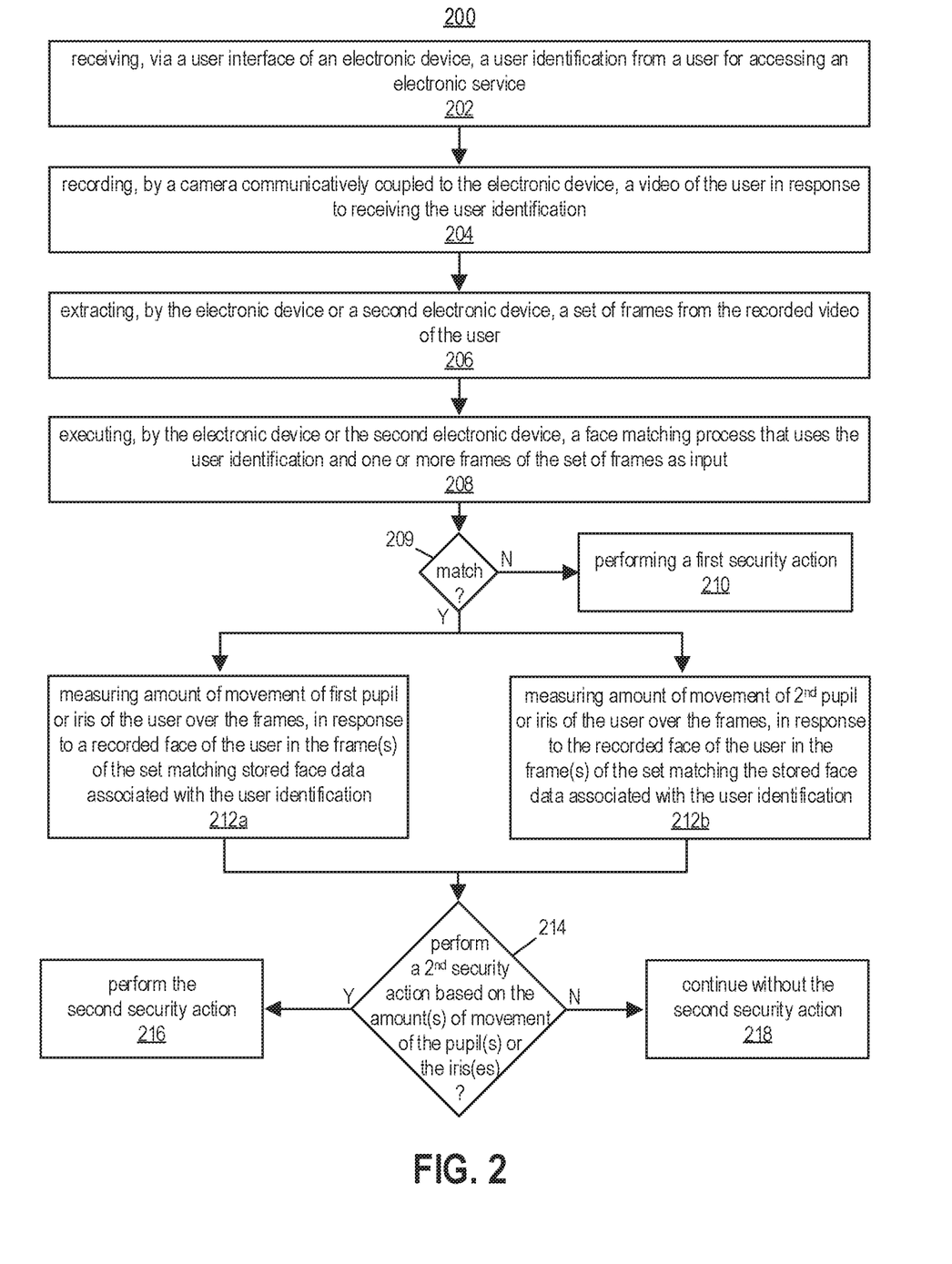
FIGS. 2, 3, and 4, are each flow diagrams of example methods for implementing liveliness detection in an authentication process using pupil or iris tracking, in accordance with some embodiments of the present disclosure.
Figure 3:
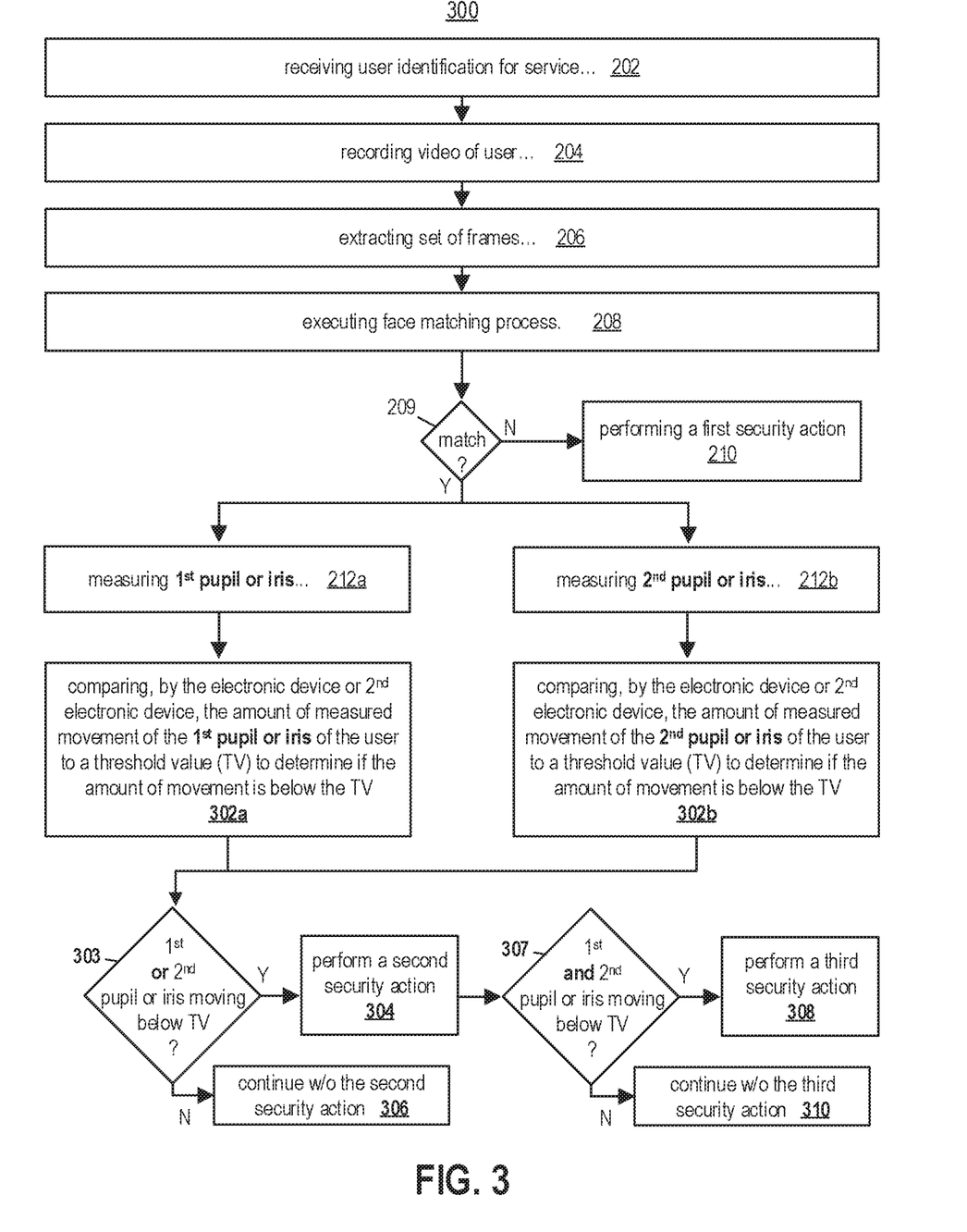
Figure 4:
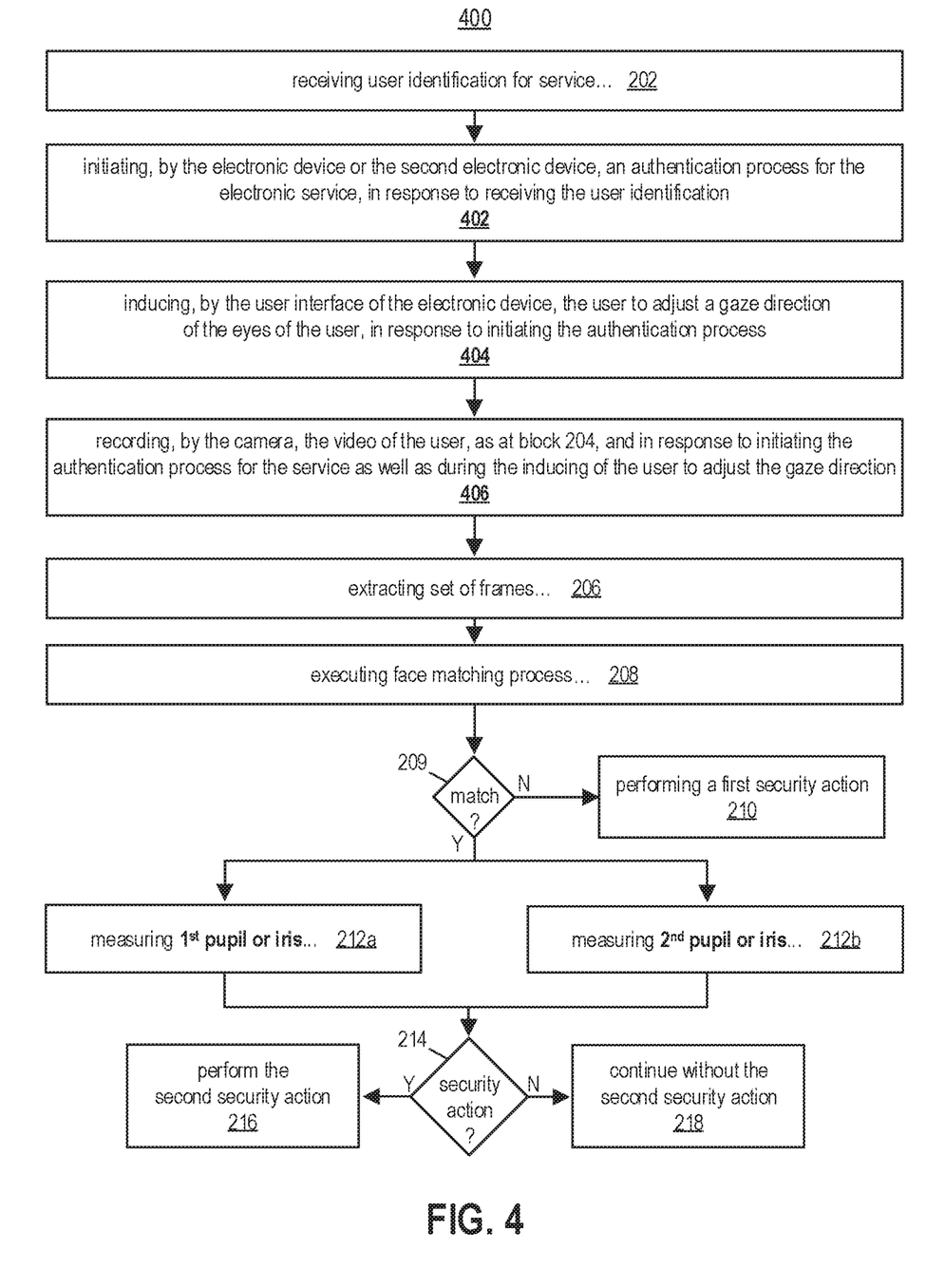

FIGS. 2, 3, and 4 are flow diagrams of example methods that can be implemented by parts of the network of computer systems 100, in accordance with some embodiments of the present disclosure. The respective methods 200, 300, and 400 in FIGS. 2, 3, and 4 can each be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods can be performed by one or more aspects of the multiple circuitries depicted in FIG. 1 as well database 107 and either one of the cameras 103a and 103b. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 2 is a flow diagram of example method 200 for implementing liveness detection in an authentication process using pupil or iris tracking, in accordance with some embodiments of the present disclosure.

At block 202, the method 200 includes receiving, via a user interface of an electronic device (e.g., UI 104 depicted in FIG. 1), a user identification from a user for accessing an electronic service (e.g., an electronic service implemented by at least ES 102). The user identification can be manually entered into the user interface by the user and/or the user identification can be stored on or part of a device such as a fob, mobile phone, or a credit card and automatically entered into the user interface.

At block 204, the method 200 includes recording, by a camera communicatively coupled to the electronic device (e.g., camera 103a or camera 103b), a video of the user in response to receiving the user identification.

At block 206, the method 200 includes extracting, by the electronic device or a second electronic device (e.g., see electronic device 110 or 112), a set of frames from the recorded video of the user. Specifically, in some embodiments, the AS 106 can be configured to extract the set of frames from the recorded video of the user.

At block 208, the method 200 includes executing, by the electronic device or the second electronic device, a face matching process that uses the user identification and one or more frames of the set of frames as input. Specifically, in some embodiments, the AS 106 can be configured to execute a face matching process that uses the user identification and one or more frames of the set of frames as input.

In some embodiments, the face matching process, in block 208, can include retrieving, from a database of the service (e.g., see database 107), the stored face data associated with the user identification. The face matching can also include comparing the stored face data to a recorded image of the face of the user in the one or more frames of the set of frames to identify whether the recorded image of the face of the user matches the stored face data. The comparing the stored face data to the recorded image of the face of the user can include segmenting parts of the recorded image prior to comparing the recorded image to the stored face data as well as comparing facial features within the segmented parts of the recorded image to corresponding facial features in the stored face data.

At block 210, the method 200 includes performing a first security action in response to a recorded face of the user in the one or more frames of the set of frames not matching stored face data associated with the user identification according to the face matching process at block 209. The stored face data, the association of the stored face data and the user identification, and the user identification can be stored and managed in a database (e.g., see database 107). Also, specifically, in some embodiments, the SC 108 can be configured to perform the first security action in response to the recorded face of the user in the one or more frames of the set of frames not matching the stored face data associated with the user identification according to the face matching.

At block 212a, the method 200 includes measuring, by the electronic device or the second electronic device, an amount of movement of a first pupil or iris of a first eye of the face of the user over the set of frames, in response to the recorded face of the user in the one or more frames of the set of frames matching stored the face data associated with the user identification according to the face matching process at block 209. Specifically, in some embodiments, the AS 106 can be configured to measure the amount of movement of the first pupil or iris of the first eye of the face of the user over the set of frames, in response to the recorded face of the user in the one or more frames of the set of frames matching the stored the face data associated with the user identification according to the face matching process.

At block 212b, the method 200 includes measuring, by the electronic device or the second electronic device, an amount of movement of a second pupil or iris of a second eye of the face of the user over the set of frames, in response to the recorded face of the user in the one or more frames of the set of frames matching the stored face data associated with the user identification according to the face matching process at block 209. Specifically, in some embodiments, the AS 106 can be configured to measure the amount of movement of the second pupil or iris of the second eye of the face of the user over the set of frames, in response to the recorded face of the user in the one or more frames of the set of frames matching the stored the face data associated with the user identification according to the face matching process.

In some embodiments, the measuring of the amounts of movement of the first and second pupils or irises, at blocks 212b and 212a, can include locating pupil centers of each pupil of the face and tracking the movements of the pupil centers over the extracted set of frames.

In some embodiments, the measuring of the amounts of movement of the first and second pupils or irises, at blocks 212b and 212a, can include, for each pupil center and for each frame of the set of frames, measuring a distance between the pupil center and a lateral corner of the eye including the pupil center as well as measuring a distance between the pupil center and a medial corner of the eye including the pupil center.

In some embodiments, the measuring of the amounts of movement of the first and second pupils or irises, at blocks 212b and 212a, can include, for each pupil center and for each frame of the set of frames, measuring a distance between the pupil center and a lateral palpebral commissure of the eye including the pupil center as well as measuring a distance between the pupil center and a medial palpebral commissure of the eye including the pupil center.

In some embodiments, the measuring of the amount of movement of a pupil can include, for each frame in the set of frames, identifying a first point in the pupil or the iris and a second point in a corner of the eye as well as measuring a distance between the first point and the second point. The identifying of the second point can include identifying the second point in a palpebral commissure of the eye. The identifying the first point can include identifying the first point in a central region of the pupil.

Alternatively, in some embodiments, the measuring of the amount of movement of a pupil can include, for each frame in the set of frames, identifying a point in the pupil, a point in a lateral palpebral commissure of the eye, and a point in a medial palpebral commissure of the eye. Also, the measuring of the amount of movement of a pupil can include, for each frame in the set of frames, measuring a distance between the point in the pupil and the point in the lateral palpebral commissure as well as measuring a distance between the point in the pupil and the point in the medial palpebral commissure.

At block 214, the method 200 includes determining, by the electronic device or the second electronic device, to perform a second security action based on one or more of the amounts of movement of one or more of the pupils or irises. In some embodiments, the method 200 includes determining, by the electronic device or the second electronic device, to perform the second security action based on the amount of movement of the first pupil or iris as well as the amount of movement of the second pupil or iris. In some embodiments, the method 200 includes determining, by the electronic device or the second electronic device, to perform the second security action based on the amount of movement of the first pupil or iris only or the amount of movement of the second pupil or iris only.

At block 216, the method 200 includes performing the second security action. And, at block 218, the method 200 includes continuing the authentication process without performing the second security action. In some embodiments, the operation of block 216 and/or the operation of block 218 is performed by the SC 108.

In some embodiments, determining to perform the security action based on the amount of movement of the pupil or the iris as well as the amount of movement of the second pupil or the second iris, at block 214, can include comparing the measured distances from each frame of the frame set to generate a distance similarity score representative of similarity between the measured distances from frame to frame. Also, in such embodiments, the method 200 can further include determining to perform the security action, at block 214, and performing the security action, at block 216, in response to the distance similarity score being below a distance similarity threshold.

Alternatively, determining to perform the security action based on the amount of movement of the pupil or the iris as well as the amount of movement of the second pupil or the second iris, at block 214, can include comparing the measured distances from each frame of the frame set to generate respective distance similarity scores for each eye representative of similarity between the measured distances from frame to frame for each eye. In such embodiments, the method 200, at block 214, can also include determining an average distance similarity score based on the respective distance similarity scores for each eye, and determining to perform the security action and performing the security action, in response to the average distance similarity score being below a distance similarity threshold.

In some embodiments, in the determination at block 214, the method 200 can include generating a distance similarity score (DSS) by comparing the measured distance(s) in a first frame of the set of frames to the measured distance(s) in a second frame of the set of frames, e.g., Similarity Score equals Absolute Value of ([Distance Between Pupil Center And Right Corner For Frame 1] minus [Distance Between Pupil Center And Right Corner For Frame 2])).

FIG. 3 is a flow diagram of another example method 300 for implementing liveliness detection in an authentication process using pupil or iris tracking, in accordance with some embodiments of the present disclosure. As shown, method 300 includes the operations of blocks 202, 204, 206, 208, 209, 210, 212a, and 212b of method 200 as well as additional operations of blocks 302a, 302b, 303, 304, 306, 307, 308, and 310.

At block 302a, the method 300 includes comparing, by the electronic device or the second electronic device, the amount of measured movement of the first pupil or iris of the user (e.g., which can be represented in DSS) to a threshold value to determine whether the measured amount of movement of the first pupil or iris is below the threshold value.

At block 302b, the method 300 includes comparing, by the electronic device or the second electronic device, the amount of measured movement of the second pupil or iris of the user (e.g., which can be represented in DSS) to a threshold value to determine whether the measured amount of movement of the second pupil or iris is below the threshold value.

At block 303, the electronic device or the second electronic device determines whether the amount of measured movement for the first or the second pupil or iris is below the threshold value. In response to determining that the amount of movement is below the threshold value, the electronic device or the second electronic device performs a second security action at block 304. In response to determining that the amount of movement is not below the threshold value, the electronic device or the second electronic device does not perform the second security action and continues with the authentication process without the second security action at block 306.

At block 303, the electronic device or the second electronic device determines whether the amount of measured movement for the first or the second pupil or iris is below the threshold value. In response to determining that the amount of movement is below the threshold value, the electronic device or the second electronic device performs a second security action at block 304. In response to determining that the amount of movement is not below the threshold value, the electronic device or the second electronic device does not perform the second security action and continues with the authentication process without performing the second security action at block 306.

At block 307, the electronic device or the second electronic device determines whether the amount of measured movement for the first and the second pupil or iris are below the threshold value. In response to determining that the amount of movement for both pupils or irises are below the threshold value, the electronic device or the second electronic device performs a third security action at block 308. In response to determining that the amounts of movement for both pupils or irises are not below the threshold value, the electronic device or the second electronic device does not perform the third security action and continues with the authentication process without performing the third security action at block 310.

FIG. 4 is a flow diagram of another example method 400 for implementing liveliness detection in an authentication process using pupil or iris tracking, in accordance with some embodiments of the present disclosure. As shown, method 400 includes the operations of blocks 202, 206, 208, 209, 210, 212a, 212b, 214, 216, and 218 of method 200 as well as additional operations of blocks 402, 404, and 406 in between operations of blocks 202 and 206.

At block 402, the method 400 includes initiating, by the electronic device or the second electronic device, an authentication process for the electronic service, in response to receiving the user identification.

At block 404, the method 400 includes inducing, by the user interface of the electronic device, the user to adjust a gaze direction of the eyes of the user, in response to initiating the authentication process.

At block 406, the method 400 includes recording, by the camera, the video of the user in response to initiating the authentication process for the service and during the inducing of the user to adjust the gaze direction.

With respect to methods 200, 300, and 400, the security actions can include tagging, by the electronic device or the second electronic device, the accessing of the electronic service as suspicious. With respect to methods 200, 300, and 400, the security actions can also include blocking, by the electronic device or the second electronic device, the user from accessing the service via the electronic device.

With respect to method 400, the security actions can include ending, by the electronic device or the second electronic device, the authentication process of the service. Also, with respect to method 400, the security actions can include continuing the authentication process and increasing the number of factors used in the authentication process when the authentication process includes a multi-factor authentication process. Also, with respect to method 400, the security actions can include continuing the authentication process and changing the authentication process to a multi-factor authentication process when the authentication process initially includes a single-factor authentication process. For example, a single-factor authentication process can be a process only using a username and password as input for authentication.

Figure 5:
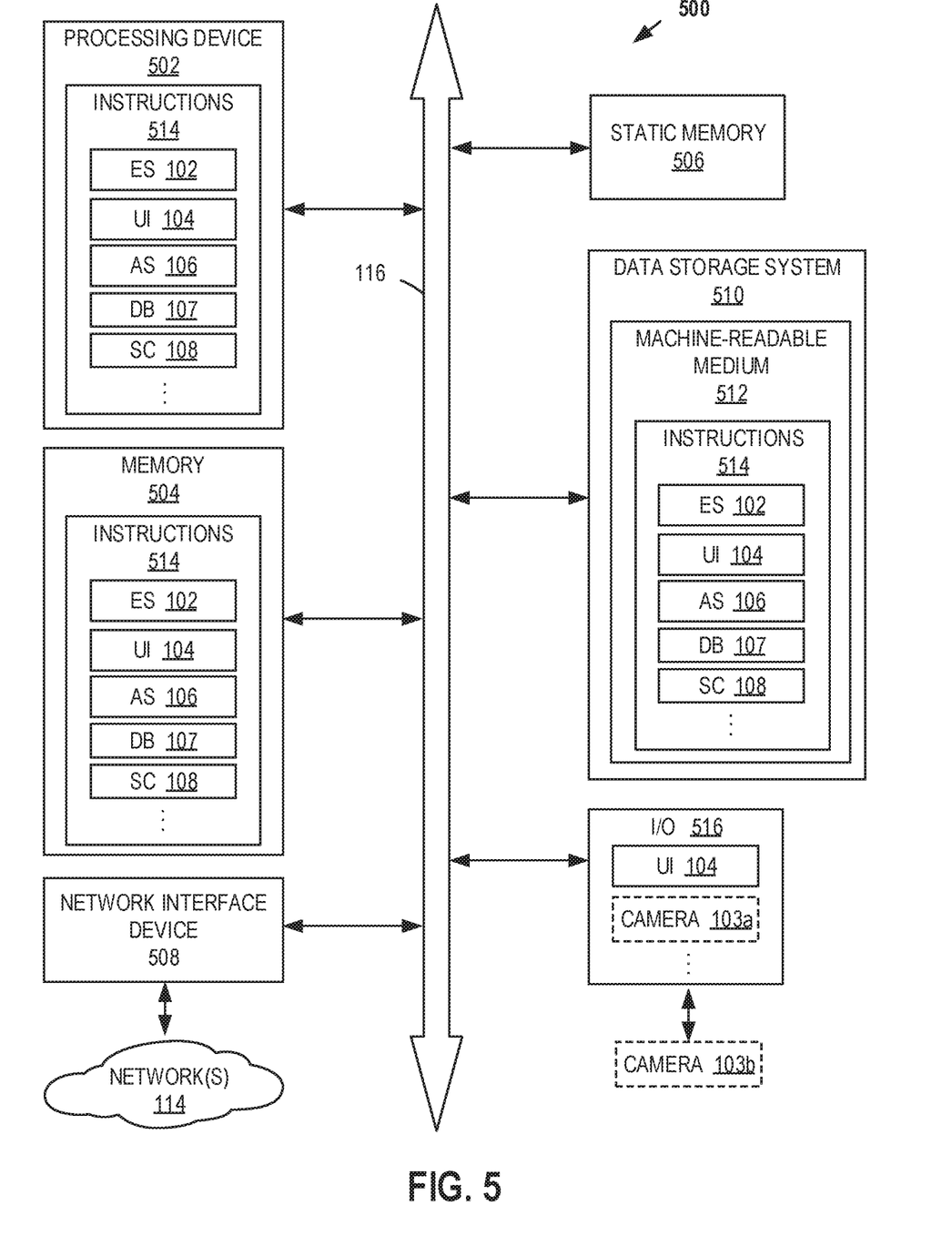
FIG. 5 is a block diagram of example aspects of an example computer system, in accordance with some embodiments of the present disclosure.

FIG. 5 is a block diagram of example aspects of an example computer system 500, in accordance with some embodiments of the present disclosure. FIG. 5 illustrates parts of the computer system 500 within which a set of instructions, for causing the machine to perform any one or more of the methodologies discussed herein, can be executed. In some embodiments, the computer system 500 can correspond to a host system that includes, is coupled to, or utilizes memory or can be used to perform the operations of a controller (e.g., to execute an operating system to perform operations corresponding to the multiple circuitries 102, 104, 106, and 108 shown in FIG. 1 as well as database 107). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine, such as an automated teller machine (ATM). Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM), etc.), a static memory 506 (e.g., flash memory, static random-access memory (SRAM), etc.), and a data storage system 510, which communicate with each other via bus 116 which is depicted in FIG. 1 too.

The processing device 502 represents one or more general-purpose processing devices such as a microprocessor, a central processing unit, or the like. More particularly, the processing device can be a microprocessor or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 514 for performing the operations discussed herein, such as operations associated with the multiple circuitries 102, 104, 106, and 108 shown in FIG. 1 as well as database 107. The computer system 500 can further include a network interface device 508 to communicate over the LAN/WAN network(s) 114 of FIG. 1.

Also, as shown in FIG. 5, the computer system 500 can include an input/output interface 516 is shown including part of the UI 104, depicted in FIG. 1, as well as optionally include camera 103a. The input/output interface 516 can also be communicatively coupled to camera 103b optionally, and/or other peripheral devices (not depicted).

The data storage system 510 can include a machine-readable storage medium 512 (also known as a computer-readable medium) on which is stored one or more sets of instructions 514 or software embodying any one or more of the methodologies or functions described herein, such as operations associated with the multiple circuitries 102, 104, 106, and 108 shown in FIG. 1 as well as database 107. The instructions 514 can also reside, completely or at least partially, within the main memory 504 and/or within the processing device 502 during execution thereof by the computer system 500, the main memory 504 and the processing device 502 also constituting machine-readable storage media.

In one embodiment, the instructions 514 include instructions to implement functionality corresponding to the multiple circuitries 102, 104, 106, and 108 shown in FIG. 1 as well as database 107. While the machine-readable storage medium 512 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    receiving, via a user interface of an electronic device, a user identification from a user for accessing an electronic service;
    recording, by a camera communicatively coupled to the electronic device, a video of the user in response to receiving the user identification;
    extracting, by the electronic device or a second electronic device, a set of frames from the recorded video of the user;
    executing, by the electronic device or the second electronic device, a face matching process that uses the user identification and one or more frames of the set of frames as input;
    measuring, by the electronic device or the second electronic device, an amount of movement of a pupil or an iris of an eye of the face of the user over the set of frames, in response to a recorded face of the user in the one or more frames of the set of frames matching stored face data associated with the user identification according to the face matching process; and
    determining, by the electronic device or the second electronic device, to perform a security action based on the amount of movement of the pupil or the iris;
    wherein the measuring of the amounts of movement of the pupil or iris comprises, for each pupil center and for each frame of the set of frames:
        measuring a distance between the pupil center and a lateral corner of the eye comprising the pupil center; and
        measuring a distance between the pupil center and a medial corner of the eye comprising the pupil center.

2. The method of claim 1, further comprising:
    measuring, by the electronic device or the second electronic device, an amount of movement of a second pupil or a second iris of a second eye of the face of the user over the set of frames, in response to the recorded face matching the stored face data according to the face matching process; and
    determining, by the electronic device or the second electronic device, to perform the security action based on the amount of movement of the pupil or the iris as well as the amount of movement of the second pupil or the second iris.

3. The method of claim 2, wherein the measuring of the amounts of movement of the first and second pupils or irises comprises locating pupil centers of each pupil of the face and tracking the movements of the pupil centers over the extracted set of frames.

4. The method of claim 3, wherein the measuring of the amounts of movement of the first and second pupils or irises comprises, for each pupil center and for each frame of the set of frames:
    measuring a distance between the pupil center and a lateral palpebral commissure of the eye comprising the pupil center; and
    measuring a distance between the pupil center and a medial palpebral commissure of the eye comprising the pupil center.

5. The method of claim 4, wherein determining to perform the security action based on the amount of movement of the pupil or the iris as well as the amount of movement of the second pupil or the second iris, comprises comparing the measured distances from each frame of the frame set to generate a distance similarity score representative of similarity between the measured distances from frame to frame, and
    wherein the method further comprises determining to perform the security action and performing the security action, in response to the distance similarity score being below a distance similarity threshold.

6. The method of claim 4, wherein determining to perform the security action based on the amount of movement of the pupil or the iris as well as the amount of movement of the second pupil or the second iris comprises:
    comparing the measured distances from each frame of the frame set to generate respective distance similarity scores for each eye representative of similarity between the measured distances from frame to frame for each eye; and
    determining an average distance similarity score based on the distance similarity score for each eye, and
    wherein the method further comprises determining to perform the security action and performing the security action, in response to the average distance similarity score being below a distance similarity threshold.

7. The method of claim 1, wherein the user identification is manually entered into the user interface by the user or wherein the user identification is stored on or part of a device and automatically entered into the user interface.

8. The method of claim 1, further comprising:
    comparing, by the electronic device or the second electronic device, the amount of measured movement of the pupil or the iris of the user to a threshold to determine whether the measured amount of movement of the pupil or the iris is below the threshold; and
    performing, by the electronic device or the second electronic device, the security action in response to the measured amount movement of the pupil or the iris being below the threshold.

9. The method of claim 8, further comprising:
    measuring, by the electronic device or the second electronic device, an amount of movement of a second pupil or a second iris of a second eye of the face of the user over the set of frames, in response to the recorded face matching the stored face data according to the face matching process;
    comparing, by the electronic device or the second electronic device, the measured amount of movement of the second pupil or the second iris of the user to the threshold to determine whether the measured amount of movement of the second pupil or the second iris is below the threshold; and
    performing, by the electronic device or the second electronic device, a second security action in response to the measured amount movement of the pupil or the iris being below the threshold as well as the measured amount movement of the second pupil or the second iris being below the threshold.

10. The method of claim 8, wherein the measuring of the amount of movement of the pupil comprises, for each frame in the set of frames:
    identifying a first point in the pupil or the iris and a second point in a corner of the eye; and
    measuring a distance between the first point and the second point.

11. The method of claim 10, wherein identifying the second point comprises identifying the second point in a palpebral commissure of the eye.

12. The method of claim 11, wherein identifying the first point comprises identifying the first point in a central region of the pupil.

13. The method of claim 8, wherein the measuring of the amount of movement of the pupil or iris comprises, for each frame in the set of frames:
identifying a point in the pupil, a point in a lateral palpebral commissure of the eye, and a point in a medial palpebral commissure of the eye;
measuring a distance between the point in the pupil and the point in the lateral palpebral commissure; and
measuring a distance between the point in the pupil and the point in the medial palpebral commissure.

14. The method of claim 1, wherein the face matching process comprises:
retrieving, from a database of the electronic service, the stored face data associated with the user identification; and
comparing the stored face data to a recorded image of the face of the user in the one or more frames of the set of frames to identify whether the recorded image of the face of the user matches the stored face data, and
wherein the comparing the stored face data to the recorded image of the face of the user comprises:
segmenting parts of the recorded image prior to comparing the recorded image to the stored face data; and
comparing facial features within the segmented parts of the recorded image to corresponding facial features in the stored face data.

15. The method of claim 1, further comprising performing, by the electronic device or the second electronic device, the security action in response to determining to perform the security action, wherein the security action comprises either:
tagging, by the electronic device or the second electronic device, the accessing of the electronic service as suspicious; or
blocking, by the electronic device or the second electronic device, the user from accessing the service via the electronic device.

16. The method of claim 1, further comprising:
initiating, by the electronic device or the second electronic device, an authentication process for the electronic service, in response to receiving the user identification;
inducing, by the user interface of the electronic device, the user to adjust a gaze direction of the eyes of the user, in response to initiating the authentication process; and
recording, by the camera, the video of the user in response to initiating the authentication process for the service and during the inducing of the user to adjust the gaze direction.

17. The method of claim 16, wherein the security action comprises either:
ending, by the electronic device or the second electronic device, the authentication process of the service;
continuing the authentication process and increasing the number of factors used in the authentication process when the authentication process comprises a multi-factor authentication process; or
continuing the authentication process and changing the authentication process to a multi-factor authentication process when the authentication process initially comprises a single-factor authentication process.

18. A system, comprising:
a user interface of an electronic device, configured to receive a user identification from a user for accessing an electronic service;
a camera communicatively coupled to the electronic device, configured to record a video of the user in response to the electronic device receiving the user identification; and
the electronic device or a second electronic device, configured to:
extract a set of frames from the recorded video of the user;
execute a face matching process that uses the user identification and one or more frames of the set of frames as input;
measure an amount of movement of a pupil or an iris of an eye of the face of the user over the set of frames, in response to a recorded face of the user in the one or more frames of the set of frames matching stored face data associated with the user identification according to the face matching process; and
determine to perform a security action based on the amount of movement of the pupil or the iris;
wherein the measuring of the amounts of movement of the pupil or iris comprises, for each pupil center and for each frame of the set of frames:
measuring a distance between the pupil center and a lateral corner of the eye comprising the pupil center; and
measuring a distance between the pupil center and a medial corner of the eye comprising the pupil center.

19. A non-transitory computer-readable storage medium comprising instructions that, when executed by a processing device, cause the processing device to:
receive, via a user interface, a user identification from a user for accessing an electronic service;
control recording, by a camera, a video of the user in response to receiving the user identification;
extract a set of frames from the recorded video of the user;
execute a face matching process that uses the user identification and one or more frames of the set of frames as input;
measure an amount of movement of a pupil or an iris of an eye of the face of the user over the set of frames, in response to a recorded face of the user in the one or more frames of the set of frames matching stored face data associated with the user identification according to the face matching process; and
determine to perform a security action based on the amount of movement of the pupil or the iris;
wherein the measure of the amounts of movement of the pupil or iris comprises, for each pupil center and for each frame of the set of frames:
measuring a distance between the pupil center and a lateral corner of the eye comprising the pupil center; and
measuring a distance between the pupil center and a medial corner of the eye comprising the pupil center.

20. A system, comprising:
a user interface of an electronic device, configured to receive a user identification from a user for accessing an electronic service;
a camera communicatively coupled to the electronic device, configured to record a video of the user in response to the electronic device receiving the user identification; and the electronic device or a second electronic device, configured to:
extract a set of frames from the recorded video of the user;
execute a face matching process that uses the user identification and one or more frames of the set of frames as input;
measure an amount of movement of a pupil or an iris of an eye of the face of the user over the set of frames, in response to a recorded face of the user in the one or more frames of the set of frames matching stored face data associated with the user identification according to the face matching process, wherein the measure of the amount of movement of the pupil comprises, for each frame in the set of frames:
identify a first point in the pupil or the iris and a second point in a corner of the eye; and
measuring a distance between the first point and the second point;
determine to perform a security action based on the amount of movement of the pupil or the iris;
compare the amount of measured movement of the pupil or the iris of the user to a threshold to determine whether the measured amount of movement of the pupil or the iris is below the threshold; and
perform the security action in response to the measured amount movement of the pupil or the iris being below the threshold.

* * * * *